Aug. 17, 1926.
D. CYGANCZUK
1,596,083
PEDAL LOCK
Original Filed Oct. 13, 1920
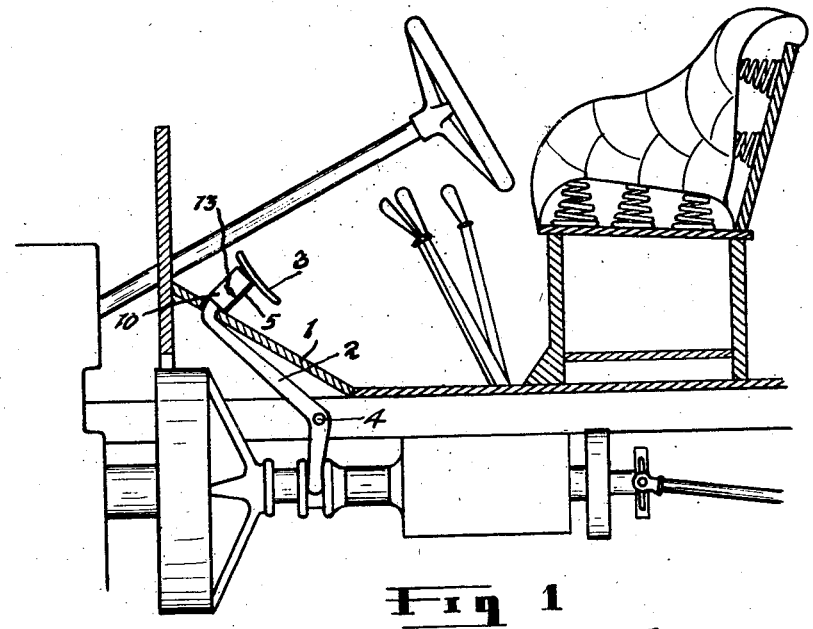
Fig 1
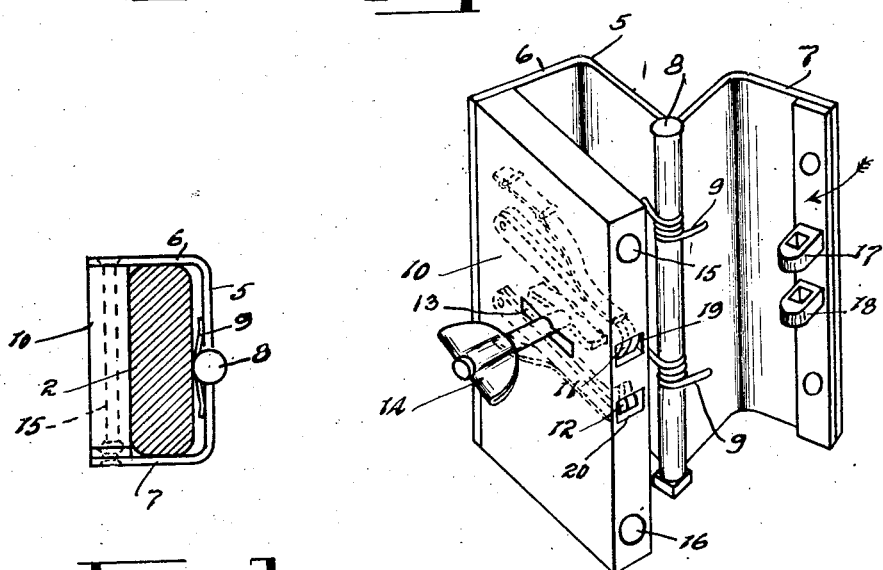
Fig 2
Fig 3
INVENTOR
D. Cyganczuk
BY
ATTYS Patented Aug. 17, 1926.

1,596,083

UNITED STATES PATENT OFFICE.

DMYTRO CYGANCZUK, OF WINNIPEG, MANITOBA, CANADA.

PEDAL LOCK.

Application filed October 13, 1920, Serial No. 416,713. Renewed April 14, 1925.

The invention relates to improvements in pedal locks, and particularly to a lock for locking the clutch pedal of an automobile, and the object of the invention is to provide a lock which can be quickly applied on, or released from the clutch pedal, and when applied on the pedal will positively prevent the pedal being manipulated and will consequently avoid the stealing of the automobile which at present very commonly occurs.

A further object is to construct the lock in a simple, inexpensive and durable manner, and such that it can be locked or unlocked by utilizing a key.

With the above objects in view the invention consists essentially in a spanner member adapted to be applied on the pedal between the foot board and the pedal foot rest and means for releasably locking the spanner member against removal, the parts being arranged and constructed as hereinafter more particularly described, reference being had to the accompanying drawing in which like characters of reference indicate corresponding parts in the several figures.

Fig. 1 is a side view of a part of an automobile showing my invention applied on the pedal.

Fig. 2 is an enlarged detail plan view of the appliance as it appears in locked position, the pedal being shown in horizontal section.

Fig. 3 is a perspective view of the lock partially opened.

1 is the foot board of an automobile and 2 the clutch pedal which is provided as is usual with a foot rest 3 for convenience in manipulating the pedal.

The pedal is pivoted at the point 4, the arrangement being such that when the foot rest is pressed towards the foot board the clutch is disengaged. Other parts of an automobile are shown but not described.

In order to lock the clutch pedal against movement I have provided a special lock shortly described which is clasped around the clutch pedal between the foot board and the foot rest, and is designed to prevent the pedal being pushed down due to the contact of the ends of the lock with the foot board and the pedal foot rest.

The lock comprises a spanner member 5 embodying two similar right and left substantially L-shaped wings 6 and 7 which are connected together by a hinge 8 of any approved form. Springs 9 are associated with the hinge and the wings, the springs having a natural tendency to open or spread the wings apart.

The spanner member so constructed is adapted to receive the clutch pedal which passes downwardly between the wings, and in carrying out my invention I provide a lock 10 of any approved form which is adapted to lock the free ends of the wings together after the spanner member has been placed to receive the pedal.

The lock casing presents customary spring locking catches 11 and 12 and key hole 13 in which the key 14 can be inserted in order to release the catches. The said lock casing is permanently fastened as by bolting as indicated at 15 and 16 to one of the wings of the spanner member whilst the other wing of the spanner member is provided with extending eyes 17 and 18 adapted to pass through receiving openings 19 and 20 provided in the lock casing and be caught by the spring catches.

In referring to Figure 3 of the drawing it will be seen that if the right hand wing be swung in the direction indicated by the applied arrow, the eyes will enter the openings 19 and 20 and be caught by the catches, the catches being of a nature such that they spring back to admit the eyes and then spring in to catch the openings of the eyes and effect the locking.

When one wishes to lock the clutch pedal he places the opened lock around the pedal between the foot rest and the foot board and then closes the wings around the pedal until the eyes are locked by the catches. Once the device is in place and locked it will be obvious that the clutch pedal cannot be pressed down with the result that one cannot start the car. All that it is necessary for the owner to do to release the lock is to insert the key in the usual way in the key hole and turn it, this resulting in the releasing of the catches and the springing open of the wings under the action of the springs associated with the hinge. The device can then be removed and the pedal manipulated in the usual way.

Whilst I have entered into a more or less detailed description of the lock employed to lock the wings around the pedal, it will readily be understood that this could be modified without in the least departing from the spirit of the invention which resides more particularly in the provision of a device which can be locked around the clutch pedal to prevent the manipulation of the same.

What I claim as my invention is:—

A device of the character described comprising three sections of equal length adapted to rest on the floor board of an automobile and to conjointly enclose one of the operating pedals to prevent actuation thereof, one of said sections consisting of a conventional lock presenting a rectangular casing enclosing the lock mechanism and the two remaining sections being in the form of L-shaped wings, an arm of one of said wings being rigidly secured at its free edge to one longitudinal edge of the lock casing with the remaining arm of said wing disposed opposite and in parallel relation to one side of said lock casing, the remaining L-shaped wing having one arm hinged at its free edge to the corresponding edge of the last mentioned arm of the rigidly secured wing, the free arm of the hingedly mounted wing being adapted to engage the remaining longitudinal edge of the lock casing and being provided with means engageable with the locking mechanism of said casing to secure the said free edge of the hingedly mounted wing thereto and a spring arranged to swing the hingedly mounted wing away from the lock casing when said wing is released from the locking mechanism.

Signed at Winnipeg, Manitoba, this 24 day of September 1920.

DMYTRO CYGANCZUK.